United States Patent [19]

Cunningham

[11] Patent Number: 5,290,431
[45] Date of Patent: Mar. 1, 1994

[54] FCC PROCESS WITH CONCENTRATORS ON CYCLONE INLETS

[75] Inventor: Brian A. Cunningham, Doylestown, Pa.

[73] Assignee: Mobil Oil Corporation, Fairfax, Va.

[21] Appl. No.: 1,882

[22] Filed: Jan. 8, 1993

[51] Int. Cl.$^5$ .................. C10G 11/18; B01J 38/72; B01J 38/30; F27B 15/08
[52] U.S. Cl. .................. 208/164; 208/113; 208/120; 209/133; 209/143; 422/144; 502/21; 502/41
[58] Field of Search .................. 502/41–44, 502/21; 208/164

[56] References Cited

U.S. PATENT DOCUMENTS

| | | | |
|---|---|---|---|
| 2,727,930 | 12/1955 | Johnson | 208/161 |
| 3,554,903 | 1/1971 | Wilson | 208/164 |
| 4,176,083 | 11/1979 | McGovern | 208/164 |
| 5,126,036 | 6/1992 | Owen | 502/43 |

OTHER PUBLICATIONS

Perry's Chemical Engineer's Handbook, 6th Edition, 20–101 (1984).
Perry's Chemical Engineer's Handbook, 6th Edition, 20–84/85 (1984).

*Primary Examiner*—Paul E. Konopka
*Attorney, Agent, or Firm*—Alexander J. McKillop; Malcolm D. Keen; Richard D. Stone

[57] ABSTRACT

A multi-stage cyclone for fluidized catalytic cracking of heavy oils is disclosed. A low efficiency inertial separator concentrates solids, FCC catalyst and fines, by forcing gas and entrained solids to make from ½ to ¾ turn. Gas, with most of the solids content removed, is charged directly into the inlet horn of a conventional high efficiency cyclone. The solids concentrator/cyclone device may be used in FCC regenerators or reactors to reduce particulate losses, reduce catalyst attrition, and reduce erosion of cyclones caused by high catalyst loadings.

7 Claims, 4 Drawing Sheets

FCC PROCESS WITH CONCENTRATORS ON CYCLONE INLETS

BACKGROUND OF THE INVENTION

1. Field of the Invention

The field of the invention is fluidized catalytic cracking of heavy hydrocarbon feeds and use of cyclones to separate cracked product or flue gas from catalyst.

2. Description of Related Art

Catalytic cracking is the backbone of many refineries. It converts heavy feeds into lighter products by catalytically cracking large molecules into smaller molecules. Catalytic cracking operates at low pressures, without hydrogen addition, in contrast to hydrocracking, which operates at high hydrogen partial pressures. Catalytic cracking is inherently safe as it operates with very little oil actually in inventory during the cracking process.

There are two main variants of the catalytic cracking process: moving bed and the far more popular and efficient fluidized bed process.

In the fluidized catalytic cracking (FCC) process, catalyst, having a particle size and color resembling table salt and pepper, circulates between a cracking reactor and a catalyst regenerator. In the reactor, hydrocarbon feed contacts a source of hot, regenerated catalyst. The hot catalyst vaporizes and cracks the feed at 425° C.-600° C., usually 460° C.-560° C. The cracking reaction deposits carbonaceous hydrocarbons or coke on the catalyst, thereby deactivating the catalyst. The cracked products are separated from the coked catalyst. The coked catalyst is stripped of volatiles, usually with steam, in a catalyst stripper and the stripped catalyst is then regenerated. The catalyst regenerator burns coke from the catalyst with oxygen containing gas, usually air. Decoking restores catalyst activity and simultaneously heats the catalyst to, e.g., 500° C.-900° C., usually 600° C.-750° C. This heated catalyst is recycled to the cracking reactor to crack more fresh feed. Flue gas formed by burning coke in the regenerator may be treated for removal of particulates and for conversion of carbon monoxide, after which the flue gas is normally discharged into the atmosphere.

Catalytic cracking is endothermic, it consumes heat. The heat for cracking is supplied at first by the hot regenerated catalyst from the regenerator. Ultimately, it is the feed which supplies the heat needed to crack the feed. Some of the feed deposits as coke on the catalyst, and the burning of this coke generates heat in the regenerator, which is recycled to the reactor in the form of hot catalyst.

Catalytic cracking has undergone progressive development since the 40s. Modern fluid catalytic cracking (FCC) units use zeolite catalysts. Zeolite-containing catalysts work best when coke on the catalyst after regeneration is less than 0.1 wt %, and preferably less than 0.05 wt %.

To regenerate FCC catalyst to this low residual carbon level and to burn CO completely to CO2 within the regenerator (to conserve heat and minimize air pollution) many FCC operators add a CO combustion promoter. U.S. Pat. Nos. 4,072,600 and 4,093,535, which are incorporated by reference, teach use of combustion-promoting metals such as Pt, Pd, Ir, Rh, Os, Ru and Re in cracking catalysts in concentrations of 0.01 to 50 ppm, based on total catalyst inventory.

Most FCC's units are all riser cracking units. This is more selective than dense bed cracking. Refiners maximize riser cracking benefits by going to shorter residence times, and higher temperatures. The higher temperatures cause some thermal cracking, which if allowed to continue would eventually convert all of the feed to coke and dry gas. Shorter reactor residence times in theory would reduce thermal cracking, but the higher temperatures associated with modern units created the conditions needed to thermally crack the feed. I believed that refiners, in maximizing catalytic conversion of feed and minimizing thermal cracking of feed, resorted to conditions which achieved the desired results in the reactor, but caused other problems which could lead to unplanned shutdowns.

Modern FCC units must run at high throughput, and run for years between shutdowns, to be profitable. Much of the output of the FCC is needed in downstream processing units, and much of a refiners gasoline pool is usually derived from the FCC unit. It is important that the unit operate reliably for years, and be able to accommodate a variety of feeds. The unit must operate without exceeding local limits on pollutants or particulates. The catalyst used is somewhat expensive, and most units require several hundred tons of catalyst in inventory. Most FCC units circulate tons of catalyst per minute, the large circulation being necessary because the feed rates are large and for every ton of oil cracked roughly 5 tons of catalyst circulation is needed.

These large amounts of catalyst must be removed from cracked products lest the heavy hydrocarbon products be contaminated with catalyst and fines. Even with several stages of cyclone separation some catalyst and catalyst fines invariable remain with the cracked products. These concentrate in the heaviest product fractions, usually in the Syntower (or main FCC fractionator) bottoms, sometimes called the slurry oil because so much catalyst is present. Refiners frequently let this material sit in a tank to allow more of the entrained catalyst to drop out, producing CSO or clarified slurry oil.

The problems are as severe or worse in the regenerator. In addition to the large amounts of catalyst circulation needed to satisfy the demands of the cracking reactor, there is an additional internal catalyst circulation that must be dealt with. In most bubbling bed catalyst regenerators, an amount of catalyst equal to the entire catalyst inventory will pass through the regenerator cyclones every 15 minutes or so. Most units have several hundred tons of catalyst inventory. Any catalyst not recovered using the regenerator cyclones will remain with the regenerator flue gas, unless an electrostatic precipitator, bag house, or some sort of particulate scrubber is added at considerable cost. The amount of fines in most FCC catalyst flue gas streams is also sufficient to cause severe erosion of turbine blades if a power recovery system is installed to try to recover some of the energy in the regenerator flue gas stream.

Most refiners now use higher efficiency cyclones, which improve separation by increasing inertial forces. Most high efficiency cyclones in FCC now force incoming vapor to circle around the barrel at least 3 times, and many require 4 or 5 or more revolutions within the cyclone before flue gas can exit. At first refiners used better cyclones simply to decrease the amount of expensive catalyst lost to the atmosphere with FCC flue gas. Now, the driving force behind cyclone improvement is more likely to be reduced particulates emissions from flue gas, and to a somewhat lesser extent fines in heavy products.

While high efficiency cyclones have increased recovery of conventional FCC catalyst in the regenerator, and increased the per pass removal of catalyst fines, they have not always reduced catalyst and fines losses to the extent desired. Some refiners were forced to install electrostatic precipitators downstream of regenerators to reduce fines emissions. Some refiners had difficulty removing fines from heavy liquid product streams such as slurry oil products to meet product specifications.

The net effect of high efficiency cyclones seemed to be an decrease in loss of conventional FCC catalyst as 60–80 micron particles, coupled with an increase in the rate of production of catalyst fines. This is because of the way high efficiency cyclones work. They subject FCC catalyst to higher inertial forces, forcing catalyst to make multiple revolutions, usually about 4 to 5 revolutions, around the inside of the barrel before being removed.

Attrition of catalyst, and also wear to the cyclone, is generally agreed to be a linear function of catalyst loading in the gas and of the number of spirals in the cyclone. High efficiency cyclones, and large amounts of catalyst traffic, combine to create a harsh environment for cyclones and catalyst.

I wanted a way to retain the good catalyst recovery characteristics of high efficiency cyclones, reduce the wear on these cyclones caused by the FCC catalyst, and reduce the wear on the catalyst caused by the cyclones. Some steps had been taken on the reactor side of the FCC process to reduce the dilute phase catalyst traffic entering the reactor cyclones, by using a rough cut separator on the riser outlet. A similar approach was discharge of a riser reactor downward within a reactor vessel from an elevation high enough above the catalyst stripper to keep the cracked product vapors from stirring up the stripper catalyst bed. While these approaches, generally directed at reducing the amount of catalyst unnecessarily introduced into a dilute phase region, will help, they will do nothing to reduce catalyst entrainment into a dilute phase above a fluidized bed caused by superficial vapor velocity through the fluidized bed. This dilute phase catalyst traffic will always be present. Resort to wider diameter reactor or regenerator vessels (to reduce vapor velocities in upper portions of a regenerator) will reduce vapor velocities, but greatly increases the size and cost of these vessels, and may create additional problems. Enlarged diameter reactor vessels could easily produce coke in stagnant regions. Enlarged diameter regenerator vessels will reduce dilute phase catalyst traffic and make the regenerator more susceptible to dangerous temperature excursions from dilute phase CO combustion or afterburning. In regenerators the presence of large amounts of catalyst in the dilute phase can be beneficial from the standpoint of a heat sink.

I realized that the conventional approaches were not adequate. High efficiency cyclones consume power, and produce fines, at least they did in the regenerator. Simply adding more stages of conventional cyclones upstream or downstream of the existing cyclones would not solve the problem, some units now have third stage cyclones. Simply stuffing more stages of cyclone separation into a vessel will usually increase dilute phase catalyst traffic, for reasons discussed in more detail hereafter.

Dilute phase traffic, and fines emissions, can increase because modern FCC regenerators and reactor vessels are filled with cyclones, usually 8 to 16 of them per stage of separation. These cyclones are a large part of the capital cost of FCC units, and are absolutely essential for operation. While it may be physically possible to add more cyclones, the extra diplegs associated with these additional cyclones decreases the area available for flue gas flow from the top of the fluidized bed to the inlet horn of the cyclones. More cyclones diplegs can increase superficial vapor velocity in the dilute phase region above a fluidized bed, causing additional entrainment into the cyclones. If enough cyclone diplegs, of sufficiently large diameter, were added to, e.g., an FCC regenerator, it could increase catalyst traffic greatly, because of the higher velocity. The situation is analogous to the problem faced by ancient bridge builders trying to span a river. Putting in more stone piles to support the bridge decreased the area available for water flow, increasing water velocity, and increasing the need for stone supports.

I realized that the way to improve the operation of high efficiency cyclones, and eliminate most of their shortcomings was to rely on a low efficiency separation device in, or just upstream of the inlet horn of the high efficiency cyclones. I realized that a low pressure drop device which did a poor job of catalyst separation, letting at least an order of magnitude more catalyst escape with the flue gas than even conventional cyclone separators, provided the ideal way to eliminate most of the wear on, and caused by, high efficiency cyclones.

This allowed me to greatly decrease wear on cyclones, and to reduce catalyst attrition and abrasion caused by cyclones. While this is very beneficial, it could also increase catalyst traffic in the dilute phase, so unique equipment was developed which could be used to greatly reduce the load on cyclones and on catalyst, without increasing catalyst traffic at all in the dilute phase regions above fluidized beds.

BRIEF SUMMARY OF THE INVENTION

Accordingly, the present invention provides a two stage cyclone separator comprising a low efficiency, inertial separator and a high efficiency cyclone separator, said high efficiency cyclone separator comprising: a cyclone having a shell with a generally vertical upper chamber having an inner diameter and a lower chamber having a smaller diameter; at least one horizontal duct cyclone inlet in said upper chamber adapted to admit gas and entrained solids tangentially into said upper chamber intermediate to a wall of said upper chamber and a cyclone outlet tube, said horizontal duct having a height and a width; an entrained solids outlet in the lower chamber of said cyclone; and a vertical, cylindrical cyclone outlet tube within said upper chamber having a height and a width and having a gas outlet passing up through said upper chamber for removal of gas having a reduced content of entrained solids; and wherein said cyclone inlet is connected to, or within a distance equal to the equivalent diameter of said cyclone inlet to a low efficiency solids concentrator (SC) device comprising: an SC inlet tube having an equivalent diameter for admission of gas and particulates flowing in a direction and an SC inertial separation means having sidewalls, an inlet for gas and particulates, an outlet for a concentrated solids stream, and an outlet for a gas with a reduced solids content, said separation means receiving gas and solids and forcing same to make at least a $\frac{1}{2}$ turn, and permitting no more than about ¾ turn to a different direction, and causing a separation of solids from gas due to inertial forces with consequent collection of a solid rich stream which is removed from said SC separation means via a concentrated solids outlet and a reduced solids stream which is discharged via said SC outlet into said high efficiency cyclone inlet.

In another embodiment, directed to use of my solids concentrator in an FCC regenerator, the present invention provides a fluidized catalytic cracking (FCC) process for catalytic cracking of a feed comprising hydrocarbons having a boiling point above about 650° F. comprising: catalytically cracking said feed in a catalytic cracking zone at catalytic cracking conditions by contacting said feed with a source of hot regenerated cracking catalyst to produce a reactor effluent mixture comprising cracked products and spent cracking catalyst containing coke and strippable hydrocarbons; separating said mixture into a cracked product vapor phase which is charged to a fractionation means for product recovery and a spent catalyst phase; stripping said spent catalyst phase in a stripping means at stripping conditions to produce stripped catalyst; regenerating said stripped catalyst in a bubbling bed catalyst regeneration means comprising a vessel having an inlet for spent catalyst, an inlet in a lower portion of said vessel for regeneration gas, an outlet in a lower portion of said vessel for regenerated catalyst, and a plurality of primary cyclone separators in an upper portion of said vessel receiving flue gas and entrained catalyst, and wherein said primary cyclone separators have operatively associated with the inlet to said primary cyclone separators a low efficiency solids concentrator (SC) device comprising: an SC inlet tube having an equivalent diameter for admission of flue gas and entrained catalyst flowing in a direction; and an SC inertial separation means having sidewalls, an inlet for flue gas and entrained catalyst, an outlet for catalyst, and an outlet for flue gas with reduced catalyst content, said separation means receiving said flue gas and entrained catalyst and forcing same to make at least about a ½ turn, and permitting no more than about ¾ turn to a different direction, and causing a separation of catalyst from flue gas due to inertial forces with consequent collection of a catalyst rich stream which is discharged down from said SC separation means via a catalyst outlet back into a lower portion of said regenerator vessel and a reduced catalyst content flue gas vapor phase which is discharged via said SC outlet into said inlet of said primary separator; and withdrawing from a lower portion of said regenerator vessel regenerated catalyst and recycling said regenerated catalyst to said cracking reactor to crack heavy feed.

In another embodiment, directed to use of my solids concentrators on the riser reactor outlet, the present invention provides a fluidized catalytic cracking process for catalytic cracking of a feed comprising hydrocarbons having a boiling point above about 650° F. comprising: catalytically cracking said feed in a catalytic cracking zone riser reactor at catalytic cracking conditions by contacting said feed with a source of hot regenerated cracking catalyst to produce a riser effluent mixture comprising cracked products and spent cracking catalyst containing coke and strippable hydrocarbons; separating said mixture in a low efficiency solids concentrator (SC) device comprising: an SC inlet tube having an equivalent diameter for admission said effluent mixture flowing in a direction; and an SC inertial separation means having sidewalls, an inlet for said effluent mixture, an outlet for a concentrated solids stream, and an outlet for a gas with a reduced solids content, said separation means receiving said effluent mixture and forcing same to make at least about a ½ turn, and permitting no more than about ¾ turn to a different direction, and causing a separation of catalyst solids from gas due to inertial forces with consequent collection of a catalyst rich stream which is discharged down from said SC separation means via a catalyst phase outlet and a reduced catalyst content cracked product vapor phase which is discharged via said SC outlet; stripping and regenerating said catalyst discharged from said SC inertial separation means to produce regenerated catalyst which is recycled to crack heavy feed; and removing said cracked product vapor phase and charging same to a fractionation means for product recovery.

DETAILED DESCRIPTION

Figure 1:
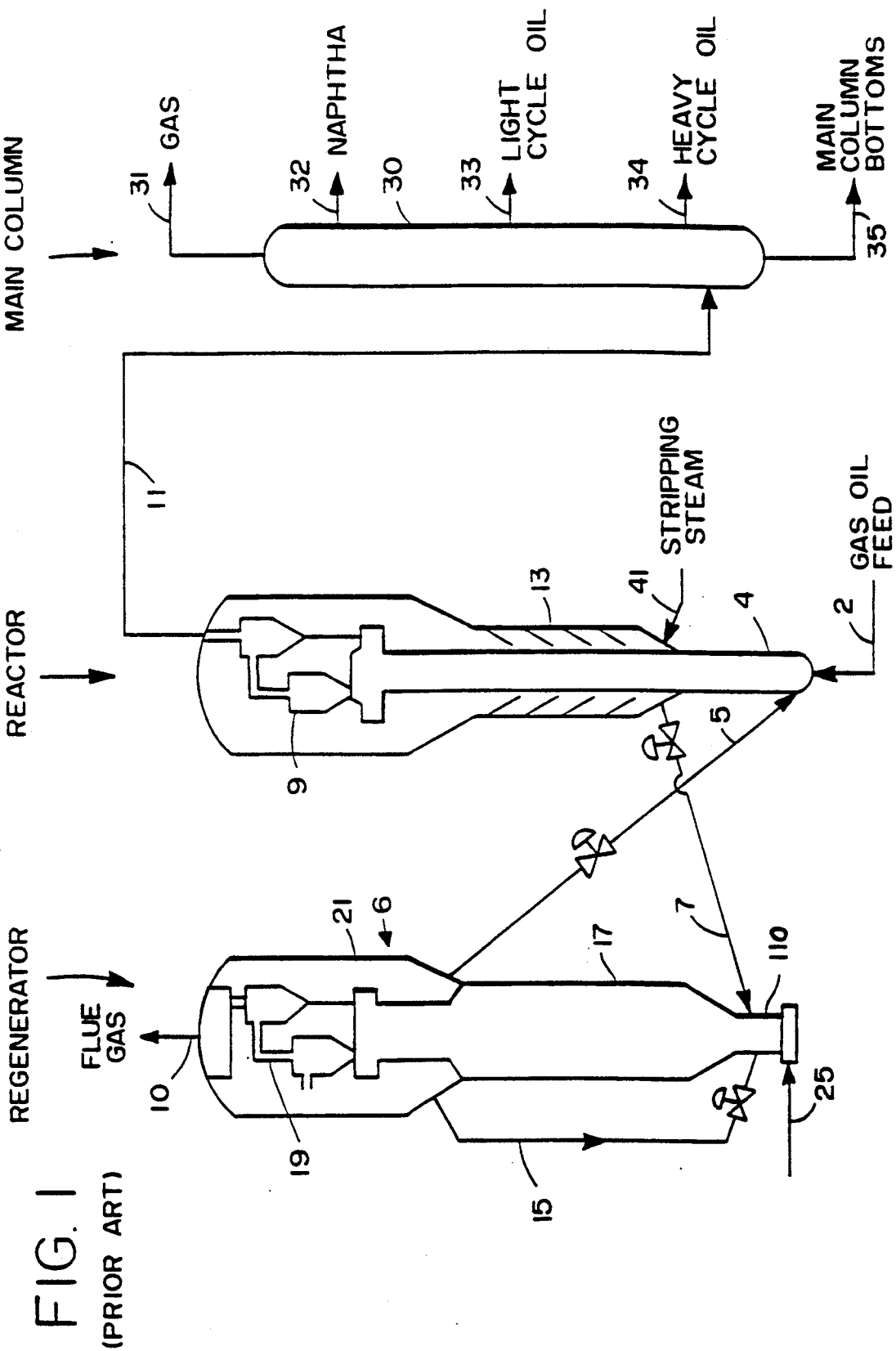
FIG. 1 (prior art) is a simplified schematic view of an FCC unit of the prior art.
Figure 2:
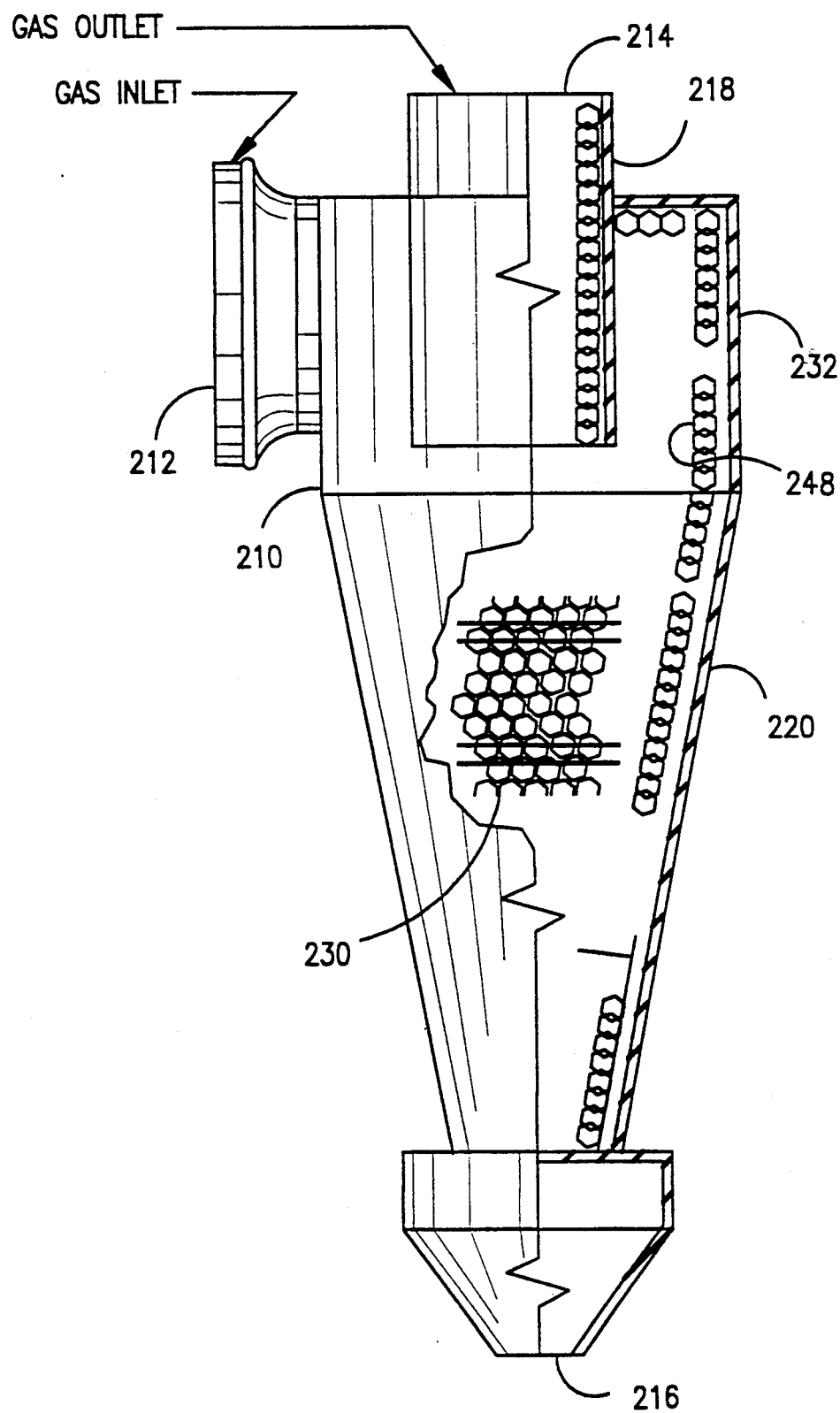
FIG. 2 (prior art) is a simplified schematic view of a conventional high efficiency cyclone.

The present invention can be better understood by reviewing it in conjunction with a conventional riser cracking FCC unit. FIG. 1 illustrates a fluid catalytic cracking system of the prior art. It is a simplified version of FIG. 1 of U.S. Pat. No. 4,421,636, which is incorporated herein by reference. FIG. 2 illustrates a conventional cyclone.

A heavy feed, typically a gas oil boiling range material, is charged via line 2 to the lower end of a riser cracking FCC reactor 4. Hot regenerated catalyst is added via conduit 5 to the riser. Preferably, some atomizing steam is added, by means not shown, to the base of the riser, usually with the feed. With heavier feeds, e.g., a resid, 2–10 wt. % steam may be used. A hydrocarbon-catalyst mixture rises as a generally dilute phase through riser 4. Cracked products and coked catalyst are discharged from the riser. Cracked products pass through two stages of cyclone separation shown generally as 9 in the figure. In commercial FCC reactor vessels, the upper regions of the vessel are actually quite crowded because so many cyclones are present, and each is of fairly good size.

The riser 4 top temperature, which usually is close to the temperature in conduit 11, ranges between about 480° and 615° C. (900° and 1150° F.), and preferably between about 510° and 595° C. (950° and 1050° F.). The riser top temperature is usually controlled by adjusting the catalyst to oil ratio in riser 4 or by varying feed preheat.

Cracked products are removed from the FCC reactor via transfer line 11 and charged to the base of the main column 30. In some refineries, this column would be called the Syncrude column, because the catalytic cracking process has created a material with a broad boiling range, something like a synthetic crude oil. The main column 30 recovers various product fractions, from a heavy material such as main column bottoms, withdrawn via line 35 to normally gaseous materials, such as the vapor stream removed overhead via line 31 from the top of the column. Intermediate fractions include a heavy cycle oil fraction in line 34, a light cycle oil in line 33, and a heavy naphtha fraction in line 32.

Cyclones 9 separate most of the catalyst from the cracked products and discharges this spent catalyst down via diplegs to a stripping zone 13 located in a lower portion of the FCC reactor. This Figure is typical of the way cyclones are shown in most FCC literature, i.e., a single cyclone. In practice multiple stages of cyclone separation, with multiple cyclones in parallel, are the norm. The reactor cyclones can shut down an FCC, either by allowing catalyst to pass in large amounts into the main column, or by preventing cracked products from leaving the reactor.

Stripping steam is added via line 41 to recover absorbed and/or entrained hydrocarbons from spent catalyst. Stripped catalyst is removed via line 7 and charged to a high efficiency regenerator 6. A relatively short riser-mixer section 110 is used to mix spent catalyst from line 7 with hot, regenerated catalyst from line 15 and combustion air added via line 25. The riser mixer discharges into coke combustor 17. Regenerated catalyst is discharged from an upper portion of the dilute phase transport riser above the coke combustor. Hot regenerated catalyst collects as a dense phase fluidized bed, and some of it is recycled via line 15 to the riser mixer, while some is recycled via line 5 to crack the fresh feed in the riser reactor 4. Several stages of cyclone separation are used to separate flue gas, removed via line 10.

The FCC unit described above uses a high efficiency regenerator, which is usually less troublesome re. particulates emissions than bubbling dense bed regenerators. Even high efficiency regenerators have problems making particulates emissions specifications, due to excessive catalyst traffic entering the primary cyclones, and the process and apparatus of the present invention will greatly reduce these problems. It should be noted that bubbling dense bed regenerators usually have more severe problems of excessive catalyst traffic, so the scope of the present invention should in no way be limited to the particular regenerator design shown in FIG. 1.

FIG. 2 shows a conventional cyclone, taken from API Publication 931—Cyclone Separators, 1975. The discussion which follows presumes that the cyclone is being used on the reactor side of an FCC unit.

Hot cracked vapor and entrained spent catalyst enter cyclone 210 via gas inlet 212. The incoming gas stream enters the cyclone tangentially, and swirls around outlet tube 218. The catalyst is thrown to the wall 248 while the gas passes through tube 218 and up through gas outlet 214. The wall of the outlet tube 218 and wall 248 of the cyclone are typically lined with an inch or so of refractory concrete in a hexmesh grating. Catalyst thrown to the cylindrical sidewalls 232 passes down through tapering section 220, which is also lined with refractory 230, and is discharged down via fluidized solids outlet 216. The cyclone outlet must be sealed, and sealing is usually accomplished by providing a long dipleg, not shown in FIG. 2, which is either immersed in a fluidized bed, or terminates in a flapper valve.

Figure 3:
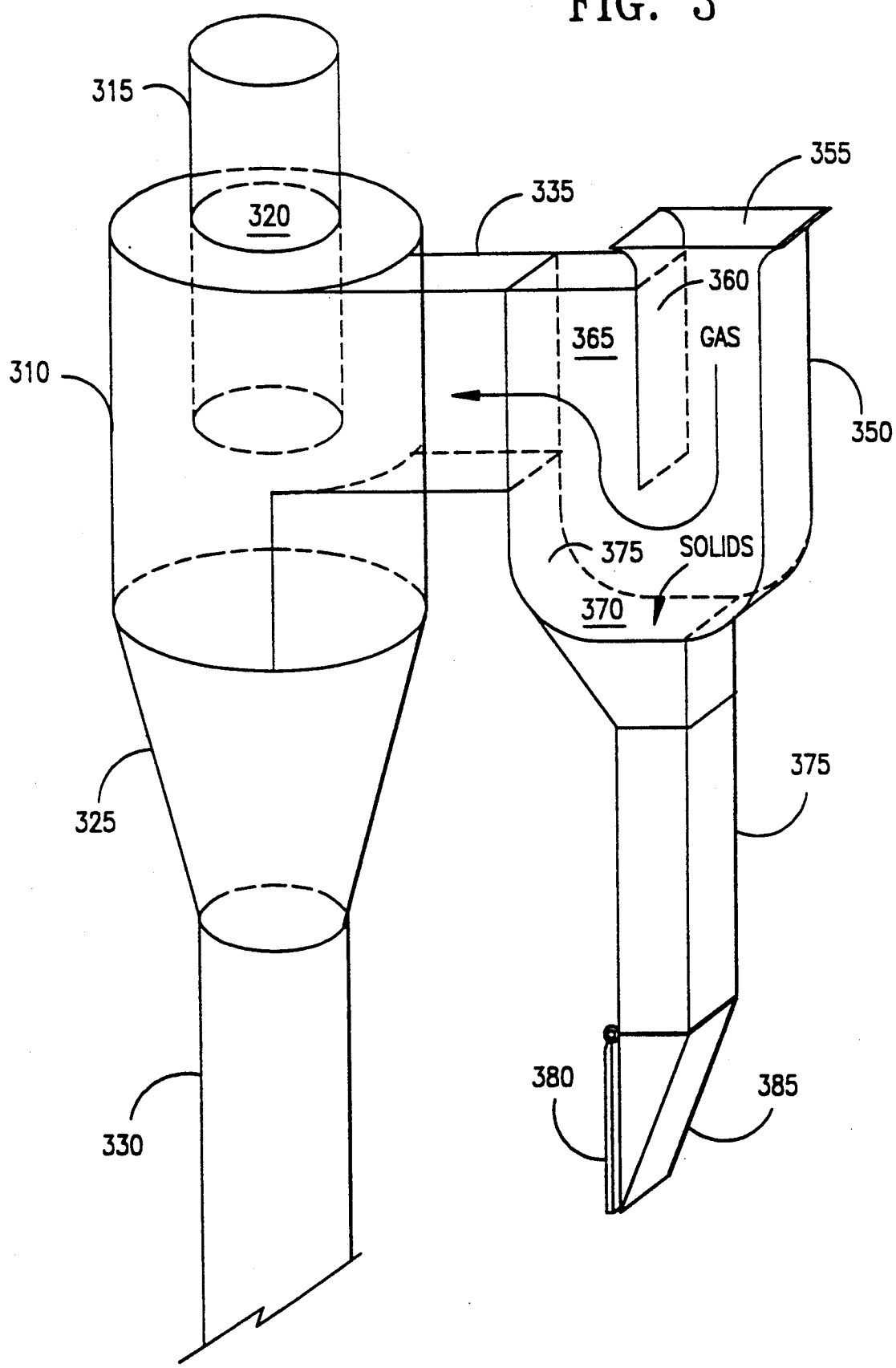
FIG. 3 (invention) is a simplified perspective view of a U tube inertial separator on the inlet horn of a conventional cyclone.

FIG. 3 (invention) shows a simplified view in perspective of a preferred embodiment of the invention which is ideal for use in bubbling bed FCC regenerators, so it will discussed as if it were in service in a regenerator.

A mixture of flue gas and entrained catalyst and fines enters the inlet 355 of U-Tube separator 350. The mixture flows down through a rectangular duct defined at one side by baffle 360 and on the other side by the outer walls of separator 350. Vapor flow reverses in a lower portion of the separator, and describes a generally U shaped path as it passes around the lower edge of baffle 360 and above the lower curved region 375 of the separator. Solids are carried by their inertia into solids outlet 370, shown as a rectangular opening which gas with a reduced solids content is discharged up into region 365, contiguous with the inlet horn 335 of conventional cyclone separator 310. Solids collect in standpipe 375, which may be of any desired shape either circular, oval or rectangular, to a sloped outlet 385 covered with flapper valve 380.

Vapor swirls around the outlet barrel 315 several times, throwing solids to the wall of the separator, producing a very clean vapor phase withdrawn via opening 320. Solids fall down the inner walls of the cyclone chamber into transition region 330 connecting with the cyclone dipleg.

Although discussed in conjunction with a regenerator, the device will also be useful in FCC reactor vessels, especially those with some dense bed cracking, or in the regions above a dense bed catalyst stripper which in turn is below a riser reactor outlet.

This is not to say that the problems of catalyst attrition in reactor cyclones are the same as those in regenerator cyclones. The temperatures, gas viscosities, and in many cases gas velocities, can be very different on the reactor side than the regenerator side of an FCC unit. Most catalyst attrition induced by inertial separation is believed to occur, in most units, in the regenerator primary cyclones, but some catalyst attrition is believed to occur in all primary cyclones. Very little attrition occurs in secondary cyclones, because usually less than about 1% of the starting particulates escape the primary cyclones to enter the secondary. In some FCC units there may be no problem meeting a flue gas particulates emissions specification, perhaps because a flue gas scrubber or electrostatic precipitator is already in place, but problems may be encountered with excessive fines or catalyst in heavy liquid product fractions.

Figure 4:
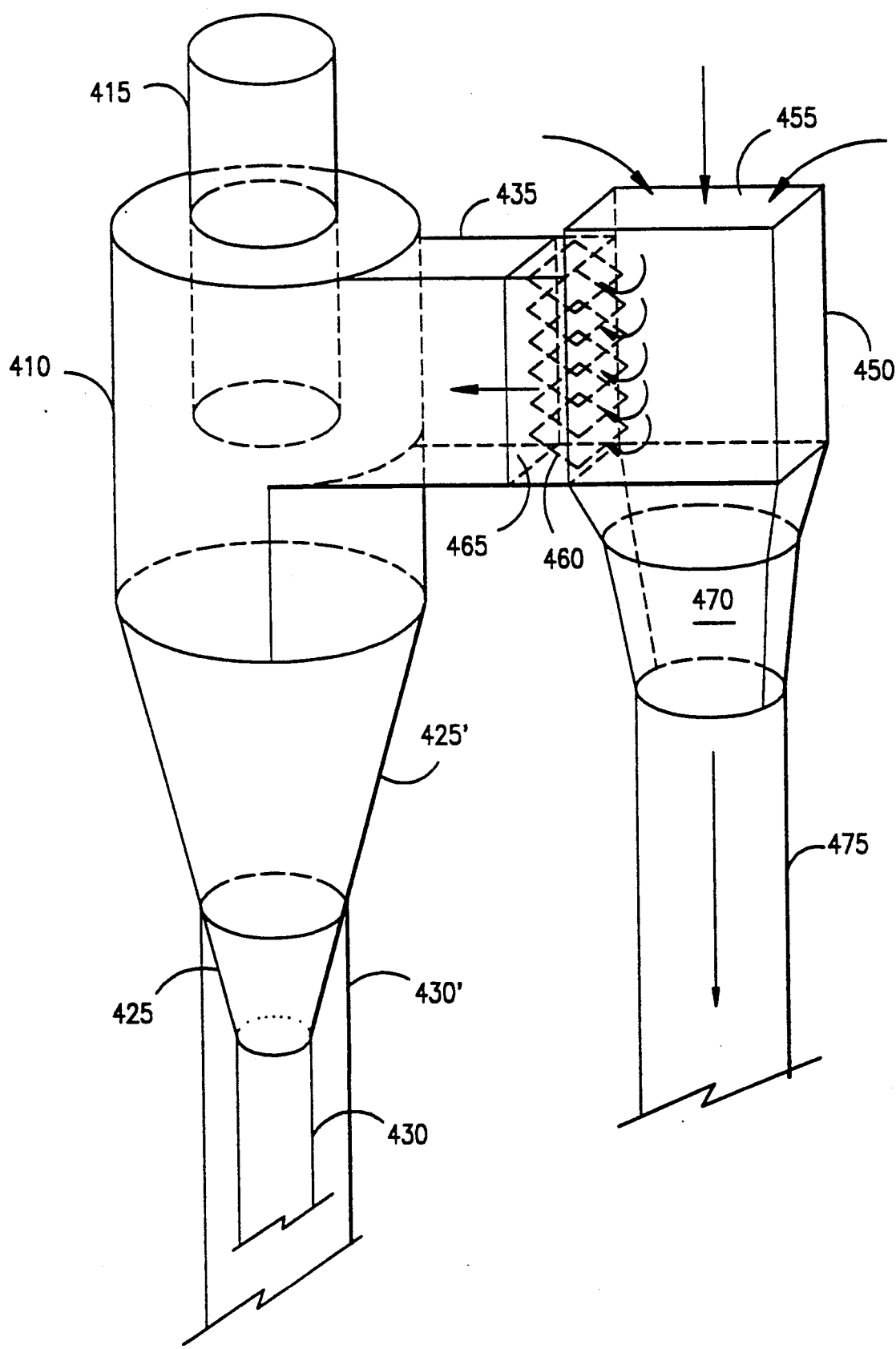
FIG. 4 (invention) is a simplified perspective view of a louvre type inertial separator on the inlet horn of a cyclone with a reduced diameter cyclone dipleg.

FIG. 4 (invention) shows a simplified view in perspective of a louvre separator which is especially useful for FCC regenerators.

Catalyst and flue gas enter the inlet region 455 of separator 450 and flow down. Gas flow down across a plurality of louvers 460, inclined plates extending across the separator outlet and inclined at an angle of 30 to 60 degrees, preferably about 45 degrees to horizontal. The gas is forced to make a roughly 270 degree turn to pass through the louvers, and in so doing the catalyst tends to travel down into the solids outlet tube as the result of its inertia. The gas, with a reduced catalyst content, travels through the louvres into the inlet horn of a conventional cyclone separator.

Having provided an overview of the FCC process and the use of relatively low efficiency, and low pressure drop, inertial separators at cyclone inlets, a more detailed review of the FCC process and of preferred inertial separators follows.

FCC FEED

Any conventional FCC feed can be used. The process of the present invention is especially useful for processing difficult charge stocks, those with high levels of CCR material, exceeding 2, 3, 5 and even 10 wt % CCR.

The feeds may range from the typical, such as petroleum distillates or residual stocks, either virgin or partially refined, to the atypical, such as coal oils and shale oils. The feed frequently will contain recycled hydrocarbons, such as light and heavy cycle oils which have already been subjected to cracking.

Preferred feeds are gas oils, vacuum gas oils, atmospheric resids, and vacuum resids. The present invention is most useful with feeds having an initial boiling point above about 650° F.

The most uplift in value of the feed will occur when at least 10 wt %, or 50 wt % or even more of the feed has a boiling point above about 1000° F., or is considered non-distillable.

FCC CATALYST

Any commercially available FCC catalyst may be used. The catalyst can be 100% amorphous, but preferably includes some zeolite in a porous refractory matrix such as silica-alumina, clay, or the like. The zeolite is usually 5-40 wt % of the catalyst, with the rest being matrix. Conventional zeolites include X and Y zeolites, with ultra stable, or relatively high silica Y zeolites being preferred. Dealuminized Y (DEAL Y) and ultrahydrophobic Y (UHP Y) zeolites may be used. The zeolites may be stabilized with Rare Earths, e.g., 0.1 to 10 wt % RE.

Relatively high silica zeolite containing catalysts are preferred for use in the present invention. They withstand the high temperatures usually associated with complete combustion of CO to $CO_2$ within the FCC regenerator.

The catalyst inventory may also contain one or more additives, either present as separate additive particles, or mixed in with each particle of the cracking catalyst. Additives can be added to enhance octane (shape selective zeolites, i.e., those having a Constraint Index of 1-12, and typified by ZSM-5, and other materials having a similar crystal structure), absorb SOX (alumina), remove Ni and V (Mg and Ca oxides).

Additives for removal of SOx are available from catalyst suppliers, e.g., Katalistiks International, Inc.'s "DeSOx."

CO combustion additives are available from most FCC catalyst vendors, and their use is preferred.

The FCC catalyst composition, per se, forms no part of the present invention.

FCC REACTOR CONDITIONS

Conventional riser cracking conditions may be used. Typical riser cracking reaction conditions include catalyst/oil ratios of 0.5:1 to 15:1 and preferably 3:1 to 8:1, and a catalyst contact time of 0.1-50 seconds, and preferably 0.5 to 5 seconds, and most preferably about 0.75 to 4 seconds, and riser top temperatures of 900° to about 1050° F.

It is preferred, but not essential, to use an atomizing feed mixing nozzle in the base of the riser reactor, such as ones available from Bete Fog. More details of use of such a nozzle in FCC processing is disclosed in U.S. Ser. No. 229,670, which is incorporated herein by reference.

It is preferred, but not essential, to have a riser catalyst acceleration zone in the base of the riser.

It is preferred, but not essential, to have the riser reactor discharge into a closed cyclone system for rapid and efficient separation of cracked products from spent catalyst. A preferred closed cyclone system is disclosed in U.S. Pat. No. 4,502,947 to Haddad et al. If closed cyclones are used on the reactor side, there will be much less incentive to use a low efficiency inertial separator to separate stripper vapor and entrained catalyst from the stripper.

It is preferred but not essential, to rapidly strip the catalyst, immediately after it exits the riser, and upstream of the conventional catalyst stripper. Stripper cyclones disclosed in U.S. Pat. No. 4,173,527, Schatz and Heffley, which is incorporated herein by reference, may be used.

It is preferred, but not essential, to use a hot catalyst stripper. Hot strippers heat spent catalyst by adding some hot, regenerated catalyst to spent catalyst. Suitable hot stripper designs are shown in U.S. Pat. No. 3,821,103, Owen et al, which is incorporated herein by reference.

If hot stripping is used, a catalyst cooler may be used to cool the heated catalyst before it is sent to the catalyst regenerator. A preferred hot stripped and catalyst cooler is shown in U.S. Pat. No. 4,820,404, Owen, which is incorporated herein by reference.

The FCC reactor and stripper conditions, per se, can be conventional.

CATALYST REGENERATION

The process and apparatus of the present invention can use conventional FCC regenerators.

Preferably a high efficiency regenerator, such as is shown in FIG. 1, is used. These have a coke combustor, a dilute phase transport riser and a second dense bed. Preferably, a riser mixer is used. These are widely known and used.

The process and apparatus can also use conventional, single dense bed regenerators, or other designs, such as multi-stage regenerators, etc. The regenerator, per se, forms no part of the present invention.

CYCLONE DESIGN

The following general guidelines can be given regards designs of a low efficiency inertial separator for use upstream of a conventional cyclone design. The discussion which follows starts with a review of conventional cyclone design, then proceeds to design of various low efficiency inertial separators. It adopts the naming conventions used in Perry's Chemical Engineers' Handbook, 6th Edition, Robert H. Perry and Don Green. The nomenclature involved in Gas-Solids Separations, from 20-75 to 20-77, FIGS. 20-106, 20-107 and 20-108 are referred to and incorporated by reference. The following relative dimensions are also based on the discussion in Perry's. All dimensions are reported in meters, with an assumed cyclone ID of 1.0 m, which is about the size of many FCC cyclones, and a convenient number to work with.

CONVENTIONAL CYCLONE DESIGN

The cyclone inner diameter is Dc. This is the diameter of the main, or upper cylinder or upper chamber. In this discussion $Dc = 1$ m. The height of this chamber is Lc=2 m. The chamber is a cylinder, twice as tall as it is wide.

Beneath the upper chamber or upper cylinder is a lower chamber, which is usually a conical section or vortex section having a height Zc=2 m. The cone portion is about as high as the cylindrical portion. The ID of the upper portion of the cone is usually equal to the ID of the upper chamber, while the ID of the base of the cone, or the solids outlet at the base of the cone, is Jc=0.25 m, though this can vary greatly.

Gas enters the cyclone upper chamber through one or more tangential ducts, which are usually in the shape of a rectangle. The width of the inlet duct is Bc=0.25 m and the height of the inlet duct is Hc=0.5 m.

Gas swirls around a cyclone outlet tube having a diameter De=0.5 m. The cyclone outlet tube has a height in the cylindrical upper chamber equal to the height of the inlet duct plus some depth below the inlet duct. The depth or penetration of the cyclone outlet tube below the base of the rectangular inlet duct is Sc=0.125 m. Thus, in this example the cyclone outlet tube has a height of 0.625 m within the upper chamber of the cyclone.

In FCC regenerators, gas velocities in most cyclones are in the range of 20-80 fps. In most units, velocities lower than this do not generate enough inertial forces to do the job, while velocities higher than this require large pressure drops, and lead to severe erosion of and by entrained catalyst. Most FCC regenerators operate with gas velocities in the inlet horn in the range of 50 to 75 fps.

In FCC reactors, gas velocities in most cyclones are in the range of 15-80 fps. As with regenerators, in most units, velocities below this do not generate sufficient inertial forces to do the job. Velocities in reactors can be somewhat lower than in regenerators, because of the lower viscosity operation due to the lower temperature operation. Riser cyclones (reactor primary cyclones) are generally also operated at lower velocities to avoid the high erosion rates associated with high catalyst circulation through the cyclones. The entire catalyst inventory of a typical FCC may go through the riser cyclones every 3-5 minutes, so very large diameter diplegs are needed for such riser cyclones. Most riser cyclones operate with velocities in the inlet horns in the range of 30-65 fps.

The diplegs of conventional, high efficiency cyclone separators in service in the FCC regenerator are relatively large. They must be large enough to permit the entire inventory in the regenerator to pass through the primary cyclones every 15 to 30 minutes, which is a lot of catalyst. Some FCC regenerators have over 500 tons of catalyst inventory, most of it in the regenerator.

In most regenerators, the primary cyclone diplegs are sized to ensure that the highest expected loading of catalyst can easily be carried away from the primary cyclones. The secondary cyclone diplegs are also sized to handle the maximum expected loading easily, but usually a minimum sizing criteria is applied to minimize the chances of bridging in the dipleg.

Preferably, the primary cyclone diplegs will be significantly reduced in size, with a reduction roughly proportional to the reduction in catalyst traffic afforded by using a low efficiency inertial separator upstream of the primary cyclone inlet horn. The primary cyclone diplegs could have almost an order of magnitude less cross sectional area, although I prefer to keep them about the same size for safety and for start-up. In my process, the diplegs of both the primary and secondary cyclones may be similar in size, and sized to accommodate much less catalyst. This reduction in cross sectional area allows less of the dilute phase region of the regenerator to be filled with diplegs. The reduced gas velocities associated with an increase in cross sectional area will allow more catalyst to slip or settle from the dilute phase region back into the dense bed without ever passing through either a cyclone or a low efficiency inertial separator.

Having reviewed the conventional cyclones, and their preferred unconventionally small diplegs, more details will be provided about various low efficiency inertial separators.

U-TUBE INERTIAL SEPARATOR

The following general guidelines can be given an a U-tube separation means such as that shown in FIG. 3. The most general guideline is also the simplest, i.e., that inertial separation forces be generated by no more than one, and preferably by ½ turn, and that the device be sized to recover from 50 to 90% or even more of the entering catalyst.

In most installations it will be preferred to make the cross sectional area of the device, at the inlet, the outlet and through the U section, approximately equal to the cross sectional area of the inlet horn of the cyclone. While some restriction of the cross sectional area through the U tube will increase velocity and generally increase separation efficiency, the improved efficiency will not generally be worth the cost of the increased complexity nor the increased pressure drop.

The solids outlet at the base of the U tube should be at least large enough to accommodate normal catalyst flow, and should be able to handle surges of 2 to 3, or even up to 5 times expected catalyst flow. The solids outlet can be considerably oversized, as shown in FIG. 3 with no undue effect, and preferably is necked down into the inertial separator dipleg so that a dipleg with a relatively small footprint can be used. The dipleg may be sealed by immersion in the bed of catalyst beneath it, but preferably it is of relatively short length, and sealed by a flapper valve or other flow reversal prevention means. The dipleg outlet may terminate only a short distance, and usually will only need to be long enough to generate enough catalyst head to force open the flapper valve or equivalent.

The inlet, and U-tube section, may be formed of tubing which has a circular, rectangular or square cross-sectional area.

LOUVRE SEPARATOR

The design method for a louvre separator is similar to that of the U-Tube. Such devices are well known for different services, and may be sized using conventional criterion to attain the desired 50 to 90% separation efficiency. In general, louvre type separators work best when the vapor flowing through the louvers is forced to take a 240–280 degree turn. The louvers may be aligned in vertical register, as shown, or in a staggered arrangement such as is common in water cooling towers or in the knockout drum upstream of some power recovery units. Staggered louvers reduces the tendency of catalyst spun away from gas passing through an upper louvre falling down directly upon a lower louvre.

I claim:

1. A fluidized catalytic cracking (FCC) process for catalytic cracking of a feed comprising hydrocarbons having a boiling point above about 650° F. comprising:
   a. catalytically cracking said feed in a catalytic cracking zone at catalytic cracking conditions by contacting said feed with a source of hot regenerated cracking catalyst to produce a reactor effluent mixture comprising cracked products and spent cracking catalyst containing coke and strippable hydrocarbons;
   b. separating said mixture into a cracked product vapor phase which is charged to a fractionation means for product recovery and a spent catalyst phase;
   c. stripping said spent catalyst phase in a stripping means at stripping conditions to produce stripped catalyst;
   d. regenerating said stripped catalyst in a bubbling bed catalyst regeneration means comprising a vessel having an inlet for spent catalyst, an inlet in a lower portion of said vessel for regeneration gas, an outlet in a lower portion of said vessel for regenerated catalyst, and a plurality of primary cyclone separators in an upper portion of said vessel receiving flue gas and entrained catalyst, and wherein said primary cyclone separators have operatively associated with the inlet to said primary cyclone separators a low efficiency solids concentrator (SC) device comprising:
      i. an SC inlet tube for admission of flue gas and entrained catalyst flowing in a downward direction;
      ii. an SC inertial separation means having sidewalls, an inlet for flue gas and entrained catalyst, an outlet for catalyst, and an outlet for flue gas with a reduced catalyst content, said separation means receiving said flue gas and entrained catalyst and forcing same to make at least about a $\frac{1}{2}$ turn, and permitting no more than about $\frac{3}{4}$ turn to a different direction, and causing a separation of catalyst from flue gas due to inertial forces with consequent collection of a catalyst rich stream which is discharged down from said SC separation means via a catalyst outlet back into a lower portion of said regenerator vessel and a reduced catalyst content flue gas vapor phase which is discharged via said SC outlet into said inlet of said primary separator; and
   e. withdrawing from a lower portion of said regenerator vessel regenerated catalyst and recycling said regenerated catalyst to said cracking reactor to crack heavy feed.

2. The FCC process of claim 1 wherein the low efficiency solids concentrator has an inlet tube with a circular cross section.

3. The FCC process of claim 1 wherein the low efficiency solids concentrator has an inlet tube with a rectangular cross section.

4. The FCC process of claim 1 wherein the low efficiency solids concentrator inertial separator is a U tube.

5. The FCC process of claim 1 wherein the low efficiency solids concentrator inertial separator is a plurality of louvres.

6. The FCC process of claim 5 wherein the louvres are vertically aligned.

7. The FCC process of claim 5 wherein the louvres force gas flow to make a 240–280 degree turn.

* * * * *